US010645544B1

(12) United States Patent
Munoz-Sanchez et al.

(10) Patent No.: US 10,645,544 B1
(45) Date of Patent: *May 5, 2020

(54) PROACTIVE OVERLOAD HANDLING ON REAL-TIME SYSTEMS

(71) Applicant: Verizon Patent and Licensing Inc., Arlington, VA (US)

(72) Inventors: Hugo David Munoz-Sanchez, Hillsborough, NJ (US); Mirza Z. Zillur, Dumont, NJ (US); Maria Cel Halili Zaballero, Ramsey, NJ (US); Daniel Osorio, Hackensack, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,096

(22) Filed: Sep. 9, 2019

Related U.S. Application Data

(63) Continuation of application No. 16/196,196, filed on Nov. 20, 2018, now Pat. No. 10,448,224.

(51) Int. Cl.
*H04M 11/00* (2006.01)
*H04W 4/24* (2018.01)
*H04M 17/00* (2006.01)
*H04W 24/04* (2009.01)
*H04M 15/00* (2006.01)

(52) U.S. Cl.
CPC ............ *H04W 4/24* (2013.01); *H04M 15/64* (2013.01); *H04M 17/35* (2013.01); *H04W 24/04* (2013.01)

(58) Field of Classification Search
CPC ....... H04W 4/24; H04W 24/04; H04M 15/64; H04M 17/35
USPC ........................................................ 455/406
See application file for complete search history.

(56) References Cited

U.S. PATENT DOCUMENTS

| | | | |
|---|---|---|---|
| 10,448,224 B1 * | 10/2019 | Munoz-Sanchez | ......... H04L 12/1403 |
| 2014/0187199 A1 | 7/2014 | Yan et al. | |
| 2014/0355428 A1 | 12/2014 | Smith et al. | |
| 2016/0262073 A1 | 9/2016 | Muley et al. | |
| 2016/0269566 A1 | 9/2016 | Gundamaraju et al. | |
| 2017/0359829 A1 | 12/2017 | Tabet et al. | |
| 2018/0262625 A1 | 9/2018 | McCarley et al. | |

* cited by examiner

*Primary Examiner* — Amancio Gonzalez

(57) ABSTRACT

A network device stores overload handling criteria for a real-time credit management system of a wireless core network. The network device monitors for overload conditions based on the overload handling criteria and determines, based on the monitoring, that a potential overload condition exists. The network device receives a first credit control request for a user device, determines a standard resource quota that is responsive to the first credit control request, and allocates an increased resource quota, over the standard resource quota, for the first credit control request. The increased resource quota is based on the potential overload condition and the overload handling criteria. The increased resource quota may prevent the system from reaching a complete overload condition, may reduce overall message traffic, and may provide time for manual or autonomous recovery from the circumstance that caused the potential overload condition.

20 Claims, 10 Drawing Sheets

| | 410 | 420 | 430 | 440 |
|---|---|---|---|---|
| 600 → | Overload Level | Overload Entry Criteria | Overload Exit Criteria | Quota Adjustment |
| 602 → | 1 | 50% CPU | 40% CPU | 2x |
| 604 → | 2 | 70% CPU | 60% CPU | 4x |
| 606 → | 3 | 95% CPU | 75% CPU | 8x |

FIG. 6A

| | 410 | 420 | 430 | 440 |
|---|---|---|---|---|
| 610 → | Overload Level | Overload Entry Criteria | Overload Exit Criteria | Quota Adjustment |
| 612 → | 1 | 2500 TPS | 2000 TPS | 1.5x |
| 614 → | 2 | 3500 TPS | 3000 TPS | 3x |
| 616 → | 3 | 4750 TPS | 3750 TPS | 6x |

FIG. 6B

PROACTIVE OVERLOAD HANDLING ON REAL-TIME SYSTEMS

CROSS-REFERENCE TO RELATED APPLICATION

This application is a continuation of U.S. patent application Ser. No. 16/196,196, entitled "Proactive Overload Handling on Real-Time Systems," filed on Nov. 20, 2018, the contents of which is hereby incorporated by reference.

BACKGROUND

In the telecommunications industry, wireless customers are often offered a service plan at an account level that may include a single device or multiple devices, such as a family plan or small business plan. For such plans, usage monitoring, alerting, management and billing statements are performed at the account level. When a subscriber/device uses the wireless network, a network service provider may grant a quota (e.g., data, minutes, messages, etc.) for the subscriber/device. Each quota may represent a portion of the available resources under the plan. For example: if a subscriber purchases a 10 gigabyte (GB) data plan, the service provider will incrementally assign a percentage of that data pool up to a maximum.

BRIEF DESCRIPTION OF THE DRAWINGS

FIG. 6A illustrates an exemplary data structure for central processing unit (CPU)-based proactive overload handling in the online charging system of FIG. 1;

FIG. 6B illustrates an exemplary data structure for transaction-based proactive overload handling in the online charging system of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Prepaid accounts for wireless customers typically include a quota for a periodic basis (e.g., monthly). For example, subscriber accounts may have a designated quota for data, voice minutes, text messages, etc. Some plans may include "unlimited" quotas and other plans may have a monthly limit (e.g., 20 Gigabytes (GB) of data, 1000 minutes of voice calls, 500 text messages, etc.). To manage shared plans, protect from network abuses, or for other policy reasons, a service provider may allocate a portion of a subscriber's monthly limit for a requested service or application. For example, a service provider may allocate a quota, such as 10% of the subscriber's total data limit, per request with a validity timer of several hours. Additional request may be submitted if the subscriber consumes the initial quota or the validity timer expires. However, if the service provider's platform for managing allocations becomes overloaded, subscriber devices may not receive timely allocations, causing disruptions for the subscriber.

Systems and methods described herein provide proactive overload handling on real-time platforms, such as credit management systems for wireless core networks, to prevent overload or facilitate the recovery from an overload condition. The systems and methods monitor platform key performance indicators (KPIs), such as CPU usage and message transactions, and predict trends towards overload conditions based on, for example, machine learning algorithms. When a trend is detected, the real-time platform will allocate increased quotas to the platform users to limit the amount of messaging traffic and CPU usage by the platform. The allocation of increased quotas may prevent the system from reaching an overload condition, may reduce overall message traffic, and may provide time for manual or autonomous recovery from the condition that caused the overload condition.

Figure 1:
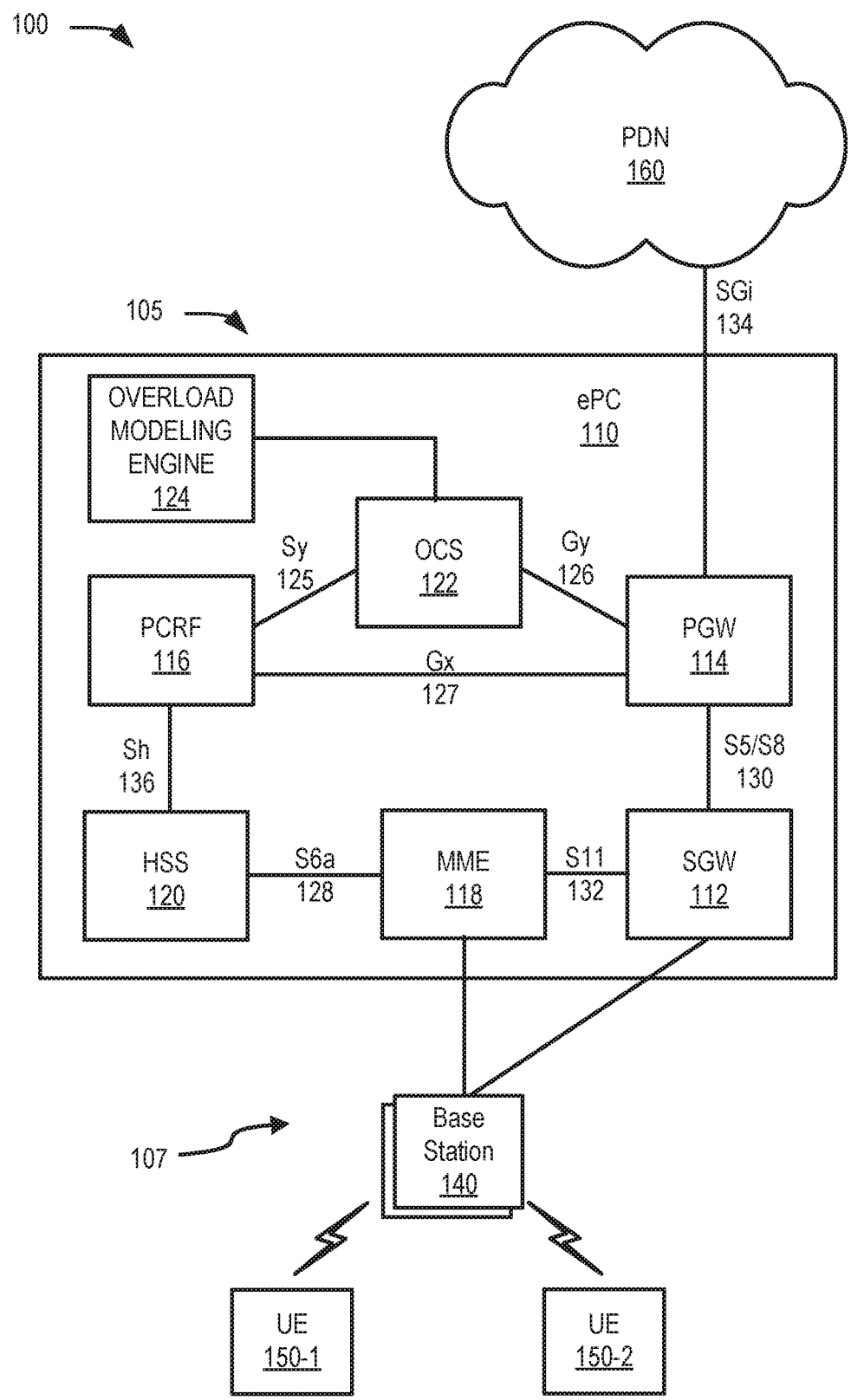
FIG. 1 is a block diagram of an exemplary network in which systems and methods described herein may be implemented.

FIG. 1 is a block diagram of an exemplary network 100 in which systems and methods described herein may be implemented. Network 100 may include wireless network 105, and a packet data network (PDN) 160. While wireless network 105 is shown in the context of a Long Term Evolution (LTE) network, it should be appreciated that embodiments presented herein may operate in any appropriate wireless network(s) such for example, 3G networks, LTE/4G networks, or 5G networks.

Wireless network 105 may include one or more devices that are physical and/or logical entities interconnected via standardized interfaces. Wireless network 105 provides wireless packet-switched services and wireless Internet Protocol (IP) connectivity to mobile devices to provide, for example, data, voice, and/or multimedia services.

Wireless network 105 may further include one or more mobile devices, such as, for example, user equipment (UEs) 150-1 and 150-2 (collectively referred to as "UE 150" and generically as "UE 150," and also referred to as a "user device"). Wireless network 105 may include one or more wireless core networks and one or more radio access networks (RANs). In the configuration of FIG. 1, wireless network 105 may include an evolved Packet Core (ePC) 110 and evolved Universal Mobile Telecommunications System (UMTS) Terrestrial Radio Access Networks (eUTRAN) 107.

ePC 110 may include one or more serving gateways (SGW) 112, packet data network (PDN) gateways (PGW) 114, Policy and Charging Rules Function (PCRF) devices 116 (also referred to herein simply as "PCRF 116"), mobility management entity (MME) devices 118, home subscriber server (HSS) devices 120, an online charging system (OCS) device 122 (also referred to herein simply as "OCS 122"), and an overload modeling engine 124. The eUTRAN 107 may include one or more base stations 140.

It is noted that FIG. 1 depicts a representative network 100 with exemplary components and configuration shown for purposes of explanation. Other embodiments may include additional or different network entities in alternative configurations than those which are shown in FIG. 1.

Further referring to FIG. 1, each base station 140 may include one or more devices and other components having functionality that allows UE 150 to wirelessly connect to eUTRAN 107. wireless station 110 may be implemented as an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

SGW 112 may provide an access point to and from UE 150, may handle forwarding of data packets for UE 150, and may act as a local anchor point during handover procedures between base stations 140. SGW 112 may interface with PGW 114 through an S5/S8 interface 130. S5/S8 interface 130 may be implemented, for example, using GTPv2.

PGW 114 may function as a gateway to PDN 160 through a SGi interface 134. PDN 160 may include, for example, an Internet Protocol (IP) Multimedia Subsystem (IMS) network, which may provide voice and multimedia services to UE 150, based on Session Initiation Protocol (SIP). In some cases, a particular UE 150, while connected to a single SGW 112, may be connected to multiple PGWs 114, one for each packet network with which UE 150 communicates. PGW 114 may enforce policies from PCRF 116 and/or data quotas from OCS 122, for individual sessions by a UE 150. For example, PGW 114 may control data speeds per subscriber and per access point name (APN).

PCRF 116 provides policy control decision and flow based charging control functionalities. PCRF 116 may include a network device, server device, or a distributed component. PCRF 116 may provide network control regarding service data flow detection, gating, and quality of service (QoS), etc. PCRF 116 may determine how a certain service data flow shall be treated, and may ensure that traffic mapping and treatment is in accordance with a user's subscription profile. According to implementations described herein, PCRF 116 may generate and update policies to accomplish these tasks based on business logic provided to PCRF 116. PCRF 116 may communicate with PGW 114 using a Gx interface 127 to dynamically implement policies for UEs 150. Gx interface 127 may be implemented, for example, using a Diameter protocol.

Still referring to FIG. 1, multiple elements in ePC 110 perform various functions for implementing QoS and policy management, such as resource quota management. As noted above, PCRF 116 may be the policy server in ePC 110. PCRF 116 may take the available network information and operator-configured policies to create service session-level policy decisions. The decisions, known as Policy and Charging Control (PCC) rules, are forwarded to a policy and charging enforcement function (PCEF) (not shown) located in PGW 114. The PCEF in PGW 114 enforces policy decisions by establishing bearers, mapping service data flows to bearers, and performing traffic policing and shaping.

MME device 118 may implement control plane processing for wireless network 105. For example, MME device 118 may implement tracking and paging procedures for UE 150, may activate and deactivate bearers for UE 150, may authenticate a user of UE 150, and may interface to non-LTE radio access networks. MME device 118 may communicate with SGW 112 through an S11 interface 132.

HSS device 120 may store information associated with UEs 150 and/or information associated with users of UEs 150. For example, HSS device 120 may store user profiles, such as a Subscriber Profile Repository (SPR), that include authentication and access authorization information. MME device 118 may communicate with HSS device 120 through an S6a interface 128. PCRF 116 may communicate with HSS device 120 through an Sh interface 136 to obtain a subscriber profile that identifies services (e.g., a prepaid voice service, a prepaid data service, a postpaid voice service, a postpaid data service, a prepaid voice-over-IP service, etc.) to which a user, associated with UE 150, has subscribed. The subscriber profile may also identify particular services, to which the user has subscribed, that are to be provided when an online charging action is performed.

OCS 122 is a credit management system that may affect, in real-time, services provided to UE 150. OCS 122 may store account settings, such a data usage plan limits, for individual accounts. Some accounts may include multiple subscribers (e.g., multiple UEs 150). OCS 122 may log data usage per account and/or per subscriber. PCRF 116 may interact with OCS 122 to check credit and report credit status over a Sy interface 125, implemented, for example, using a Diameter protocol. PGW 114 and OCS 122 may exchange credit control messages, such as a credit control request (CCR) and a credit control answer (CCA), via a Gy interface 126 for managing quotas for a particular UE 150 or multiple UEs 150. Gy interface 126 may be implemented, for example, using a Diameter protocol. According to implementations described herein, OCS 122 may apply proactive overload criteria from overload modeling engine 124, when potential overload conditions are detected, to prevent a complete overload.

Overload modeling engine 124 may include one or more network devices or computing devices. Overload modeling engine 124 may identify criteria for detection and management of overload conditions at OCS 122. For example, overload modeling engine 124 may associate KPIs for OCS usage levels with overload conditions. In one implementation, overload modeling engine 124 may apply machine learning algorithms to determine what KPI levels represent an overload condition or a potential overload condition. Additionally, overload modeling engine 124 may apply machine learning algorithms to determine appropriate responses to prevent or reduce overload conditions (e.g., particular amounts and timing of extra credit/resource quotas that OCS 122 should allocate). In some embodiments, overload modeling engine 124 may generate tables or data structures that may be used by OCS 122 to implement proactive overload handling. According to an implementation, overload modeling engine 124 may dynamically update the tables or data structures to adjust overload alarm and/or threshold levels. For example, the machine learning algorithms may dynamically fine tune thresholds to account for seasonality, time of day, number of subscribers in the platform and any other parameter that would allow improved prediction of a potential overload condition.

UE 150 may include any mobile device configured to communicate with base station 140 via wireless signals. For example, UE 150 may include a portable communication device (e.g., a mobile phone, a smart phone, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability. Each UE 150 may typically be associated with a subscriber, and the subscriber may be associated with a wireless account managed by a service provider for wireless network 105.

PDN 160 may include one or more networks, such as a local area network (LAN), a wide area network (WAN), a metropolitan area network (MAN), a telephone network, the Internet, etc., capable of communicating with UE 150. In one implementation, PDN 160 includes a network that provides data services (e.g., via packets or any other Internet protocol (IP) datagrams) to user device 110.

Figure 2:
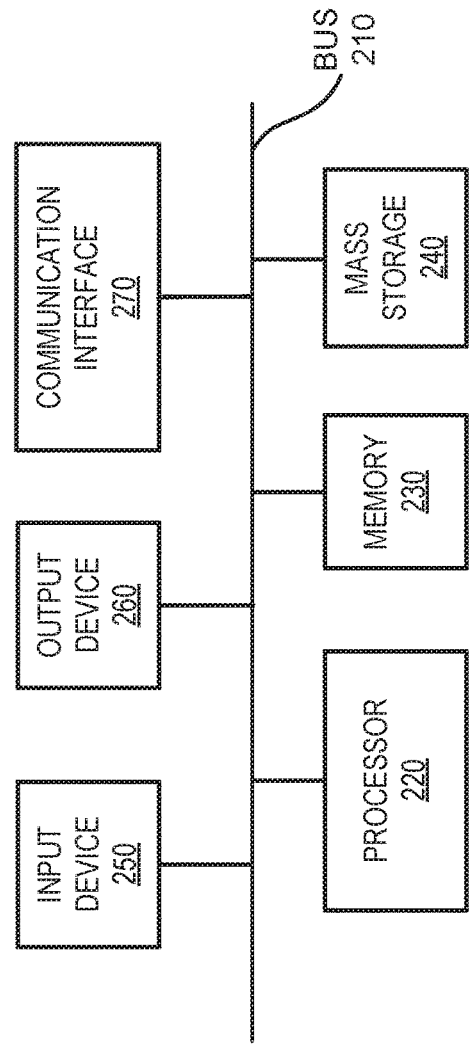
FIG. 2 is a block diagram showing exemplary components of a network device in the environment of FIG. 1.

FIG. 2 is a block diagram showing exemplary components of a network element 200, such as, for example, PGW 114, PCRF 116, OCS 122, or overload modeling engine 124, according to an embodiment. Network element 200 may include a bus 210, a processor 220, a memory 230, mass storage 240, an input device 250, an output device 260, and a communication interface 270.

Bus 210 includes a path that permits communication among the components of network element 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. For example, processor 220 may be an x86 based CPU, and may use any operating system, which may include varieties of the Windows, UNIX, and/or Linux. Processor 220 may also use high-level analysis software packages and/or custom software written in any programming and/or scripting languages for interacting with other network entities that are communicatively coupled to network 100.

Memory 230 may include any type of dynamic storage device that may store information and/or instructions, for execution by processor 220, and/or any type of non-volatile storage device that may store information for use by processor 220. For example, memory 230 may include a RAM or another type of dynamic storage device, a ROM device or another type of static storage device, and/or a removable form of memory, such as a flash memory. Mass storage device 240 may include any type of on-board device suitable for storing large amounts of data, and may include one or more hard drives, solid state drives, and/or various types of arrays.

Input device 250, which may be optional, can allow an operator to input information into network element 200, if required. Input device 250 may include, for example, a keyboard, a mouse, a pen, a microphone, a remote control, an audio capture device, an image and/or video capture device, a touch-screen display, and/or another type of input device. In some embodiments, network element 200 may be managed remotely and may not include input device 250. Output device 260 may output information to an operator of network element 200. Output device 260 may include a display, a printer, a speaker, and/or another type of output device. In some embodiments, network element 200 may be managed remotely and may not include output device 260.

Communication interface 270 may include a transceiver that enables network element 200 to communicate within network 100 with other devices and/or systems. The communication interface 270 may be configured for wireless communications (e.g., radio-frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 270 may include a transmitter that converts baseband signals to RF signals and/or a receiver that converts RF signals to baseband signals.

As described below, network element 200 may perform certain operations relating to server (e.g., PCRF 116) and/or gateway operations (e.g., PGW 114), and/or providing subscriber use and service information when embodied as OCS 122. Network element 200 may perform these operations in response to processor 220 executing software instructions contained in a computer-readable medium, such as memory 230 and/or mass storage 240. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein, such as, for example, process 500 depicted in FIG. 5. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of network element 200, in other implementations, network element 200 may include fewer components, different components, additional components, or differently arranged components than depicted in FIG. 2.

Figure 3:
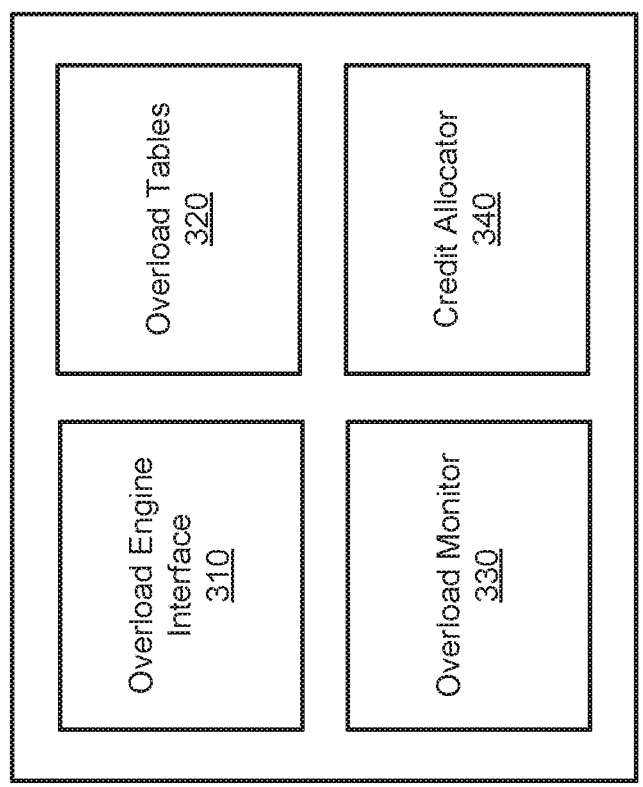
FIG. 3 is a block diagram of exemplary logical components of the online charging system of FIG. 1.

FIG. 3 is a block diagram illustrating exemplary logical components of OCS 122 according to an implementation described herein. The functional components of OCS 122 may be implemented, for example, via a processor (e.g., processor 220) executing instructions from a memory (e.g., memory 220). As shown in FIG. 3, OCS 122 may include an overload engine interface 310, overload tables 320, an overload monitor 330, and a credit allocator 340.

Overload engine interface 310 may collect and provide historical data (e.g., from OCS activity) to overload modeling engine 124. For example, overload engine interface 310 may provide data at periodic intervals, when resources permit (e.g., best effort), or as a real-time feed. Overload engine interface 310 may also obtain overload criteria (e.g., based on the historical data) from overload modeling engine 124. For example, overload engine interface 310 receive dynamic updates of proactive overload handling criteria from overload modeling engine 124. In another implementation, overload engine interface 310 may request periodic updates. Overload engine interface 310 may store current versions of the overload criteria as overload tables 320.

Figure 4:
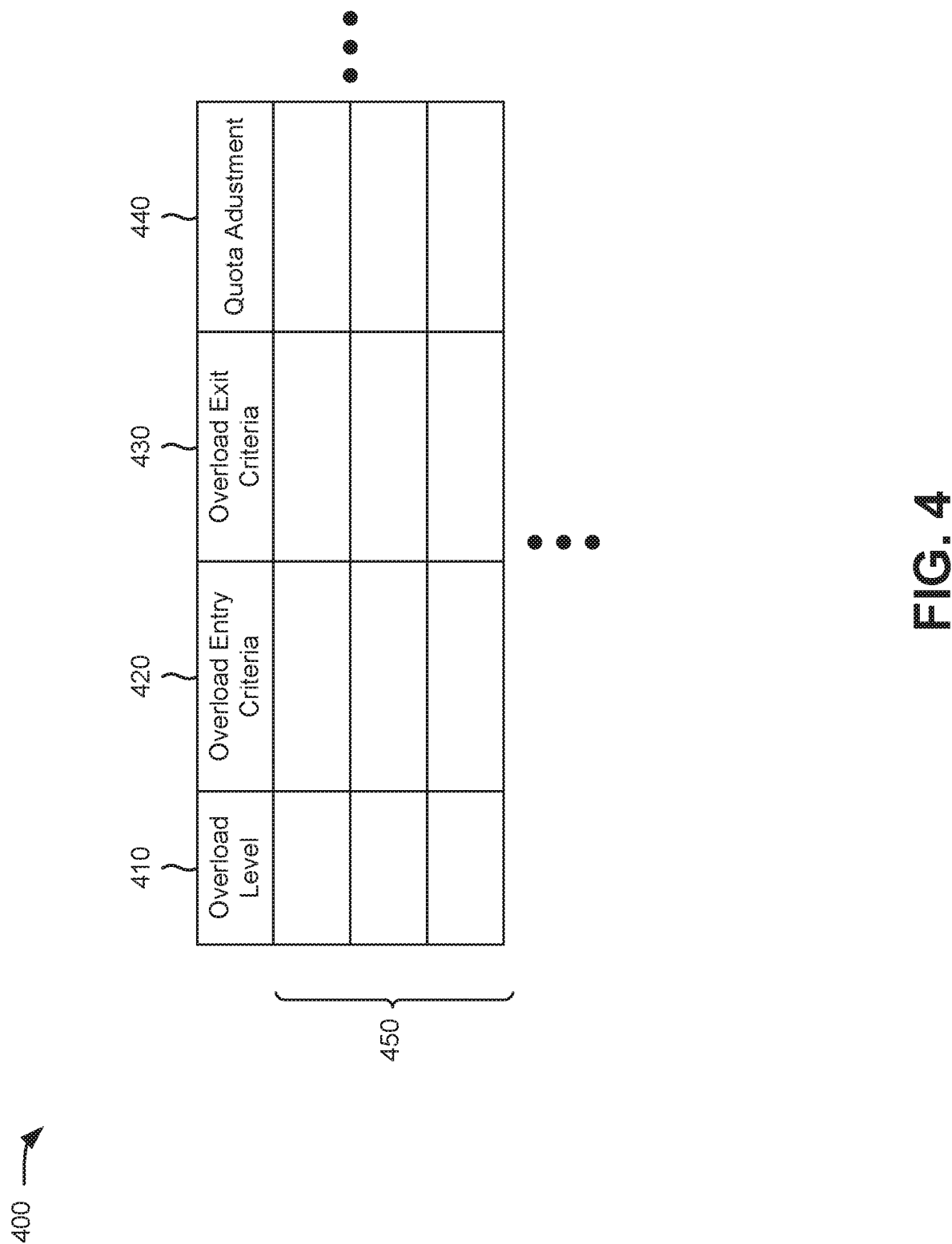
FIG. 4 is a diagram illustrating a sample data structure for proactive overload handling in the online charging system of FIG. 1.

Overload tables 320 may be used by overload monitor 330 and/or credit allocator 340 to proactively manage credit requests (e.g., CCRs) and responses (e.g., CCAs). Overload tables 320 may be stored in a central memory or in a distributed manner. According to one implementation, an initial version of overload tables 320 may be manually selected or empirically derived, with improvements and/or updates being determined using overload modeling engine 124. FIG. 4 is a diagram illustrating a sample overload handling data structure that may be generated by overload modeling engine 124 and stored as an overload table 320 for proactive overload handling.

Referring to FIG. 4, overload handling data structure 400 may include an overload level field 410, an overload entry criteria field 420, an overload exit criteria field 430, a quota adjustment field 440, and a variety of records or entries 450 associated with each of fields 410-440.

Overload level field 410 may include an identifier for a load level of OCS 122. For example, overload level field 410 may include a textual indicator (e.g., low, medium, high, none, etc.) or an alpha-numeric ranking (e.g., 0, 1, 2, 3, etc.). Overload level field 410 may generally identify different load levels leading up to a complete (e.g., 100%) overload. As described further herein, each of the load levels may be associated with a different quota multiplier indicating a likelihood of a potential overload condition.

Overload entry criteria field 420 may include a threshold load level at which responsive actions may be triggered for a corresponding level in overload level field 410. Overload entry criteria field 420 may include a KPI value that can be monitored by OCS 122 (e.g., overload monitor 330). In one implementation, overload entry criteria field 420 may include a CPU utilization level. In another implementation, overload entry criteria field 420 may include a message traffic indicator (e.g., a number of messages or transactions per second). In other implementation, different KPIs may be used to indicate load levels (e.g., memory use, response times, etc.).

Overload exit criteria field 430 may include a threshold congestion level at which a responsive actions may be disengaged. For each entry 450, overload exit criteria field 430 may include the same type of KPI value corresponding to overload entry criteria field 420 (e.g., a CPU utilization level, a number of transactions per second, etc.). In some implementations, values in overload exit criteria field 430 may indicate a smaller load than values in overload entry criteria field 420, such that the difference between values in entry criteria field 420 and overload exit criteria field 430 may form a hysteresis region in between the two thresholds to prevent system cycling.

Quota adjustment field 440 may include instructions for responding to a corresponding load level in overload level field 410. Quota adjustment field 440 may indicate a data amount, an amount of time (e.g., minutes), a number of messages, or another resource that relate to a subscriber's account limit. Quota adjustment field 440 may include, for example, a multiplier for increasing a standard CCA value. In another embodiment, quota adjustment field 440 may include a fixed value in addition to a standard CCA value. According to another implementation, quota adjustment field 440 may indicate increased validity times for an adjusted quota or standard quota. For example, quota adjustment field may increase quota validity times from a standard 8 hours up to 24 hours.

Although FIG. 4 shows an exemplary overload handling data structure overload tables 320, in other implementations, overload tables 320 may include different fields, fewer fields, or additional fields than depicted in FIG. 4. For example, in another implementation, overload tables 320 may include additional fields define more complex hysteresis scenarios or quota adjustments.

Returning to FIG. 3, overload monitor 330 may monitor KPIs of OCS 122 and identify load levels. In one implementation, overload monitor 330 may compare current load levels to overload tables 320 to determine when OCS 122 reaches a particular overload level, such as a CPU usage level and/or transaction level.

Credit allocator 340 may apply quota adjustments for particular sessions when overload monitor 330 detects an overload level. For example, credit allocator 340 may use overload tables 320 to identify a quota adjustment for a CCA when OCS 122 is at a particular overload level. According to one implementation, credit allocator 340 may not assign more quota than a subscriber has remaining available from the subscriber's profile. Thus, while quota adjustment field 440 may indicate a particular value or multiplier, credit allocator 340 may limit a quota adjustment for a particular subscriber (e.g., up to, but not to exceed, a subscriber's total data limit).

Although FIG. 3 shows exemplary logical components of OCS 122, in other implementations, OCS 122 may include fewer logical components, different logical components, or additional logical components than depicted in FIG. 3. Additionally or alternatively, one or more logical components of OCS 122 may perform functions described as being performed by one or more other logical components.

Figure 5:
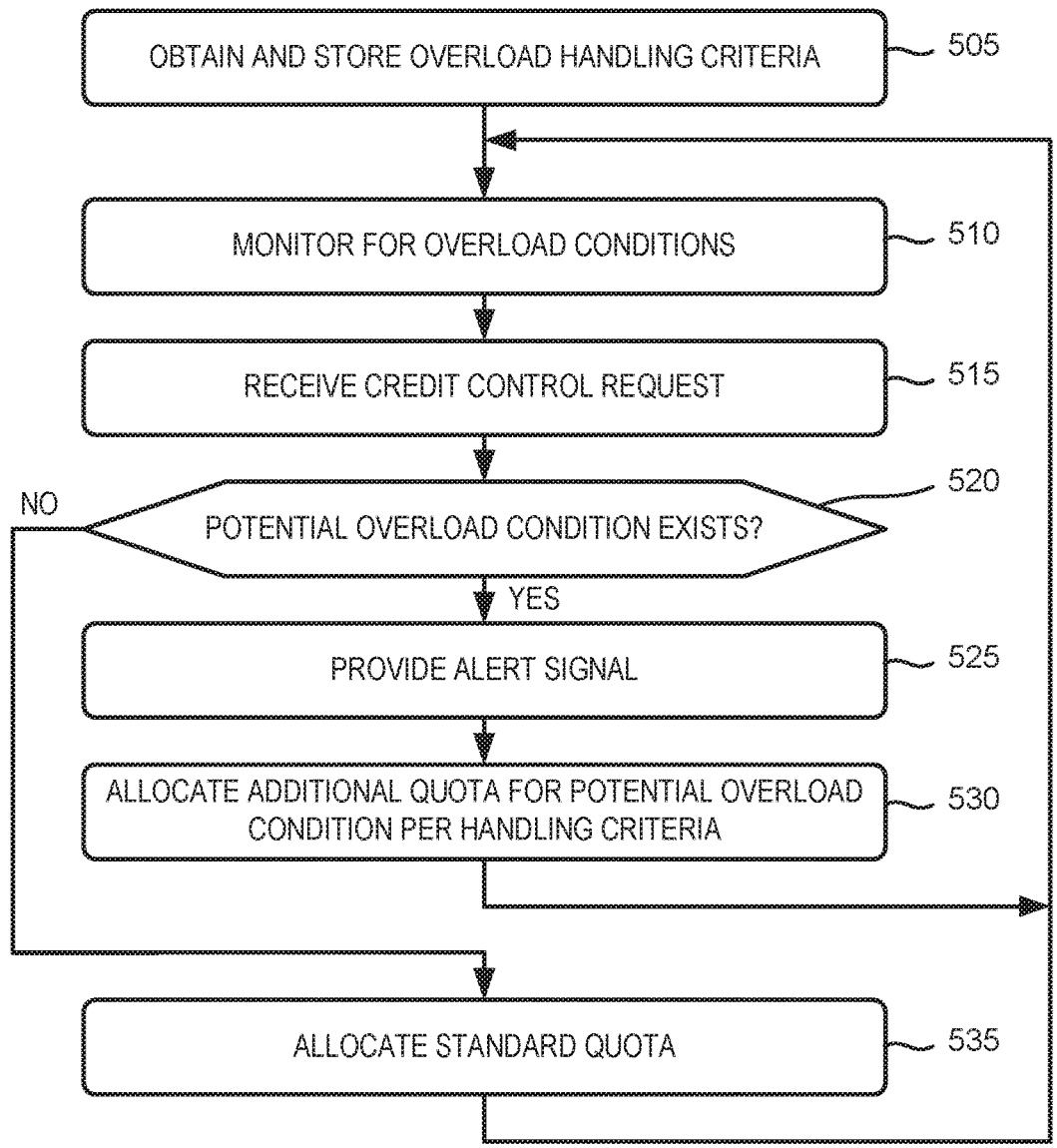
FIG. 5 is a flow chart showing an exemplary process for implementing proactive overload handling in an online charging system, according to an implementation described herein.

FIG. 5 provides a flow chart showing an exemplary process for implementing proactive overload handling. In one implementation, process 500 may be performed on a network device, such as OCS 122. In another implementation, process 500 may be performed by OCS 122 in conjunction with one or more other devices, such as PGW 114 or PCRF 116.

Process 500 may include obtaining and storing overload handling criteria (block 505) and monitoring for overload conditions (block 510). For example, in one implementation, OCS 122 (e.g. overload engine interface 310) may receive criteria for detection and management of overload conditions at OCS 122 and store overload tables 320 that may be used to implement proactive overload handling. In another implementation, OCS 122 may receive criteria for detection and management of overload conditions (e.g., overload tables 320) from overload modeling engine 124. Using the detection criteria, OCS 122 (e.g., overload monitor 330) may continuously review current levels of one or more KPIs to determine if a potential overload condition exists (e.g., Level 1, Level 2, Level 3, etc.).

Process 500 may also include receiving a credit request (block 515) and determining if a potential overload condition exists at the time the credit request is received (block 520). For example, OCS 122 may receive an initial credit control request (CCR-I) or an updated credit control request (CCR-U) for a particular session. OCS 122 (e.g., overload monitor 330) may determine if a potential overload condition exists (e.g., Level 1, Level 2, Level 3, etc.) at the time a request is received.

If a potential overload condition exists at the time the credit request is received (block 520—Yes), process 500 may include providing an alert signal (block 525) and allocating additional quota for the potential overload condition based on the handling criteria (block 530). For example, if OCS 122 determines that current OCS conditions correspond to an overload level (e.g., from overload table 320), OCS 122 may generate an alert signal (e.g., for a system administrator and/or system log file), if necessary. OCS 122 may further determine the standard quota based on the CCR and apply the overload quota adjustment corresponding to the overload condition. OCS 122 may include the adjusted quota in an initial credit control answer (CCA-I) or updated credit control answer (CCA-U).

If a potential overload condition does not exists at the time the credit request is received (block 520—No), process 500 may include allocating a standard quota for credit request (block 535). For example, if OCS 122 determines that current OCS conditions do not correspond to an overload level (e.g., from overload table 320), OCS 122 may apply standard response criteria to allocate a quota for the particular session.

FIGS. 6A and 6B are diagrams illustrating embodiments of overload handling data structure 400. More particularly, FIG. 6A illustrates a sample overload configuration table 600 based on CPU utilization, and FIG. 6B illustrates a sample overload configuration table 610 based on transaction amounts.

Referring to FIG. 6A, overload configuration table 600 may include overload level field 410, overload entry criteria field 420, overload exit criteria field 430, quota adjustment field 440, similar to data structure 400 of FIG. 4. Entries 602, 604, and 606 provide the particular usage-based overload handling configuration. Values of entries 602, 604, and 606 are for illustrative purposes. According to different embodiments, values for entries 602, 604, and 606 may be manually selected, empirically derived, and/or determined using machine learning.

As shown in configuration table 600, entry 602 indicates that an overload level 1 is triggered at 50% CPU utilization, and disengaged at 40% CPU utilization. When level 1 conditions are present, OCS 122 may apply a quota multiplier of 2 to the standard quota for each session. Entry 604 indicates an overload level 2 is triggered at 70% CPU utilization, and disengaged at 60% CPU utilization. When level 2 conditions are present, OCS 122 may apply a quota multiplier of 4 to the standard quota for each session. Entry 606 indicates an overload level 3 is triggered at 95% CPU utilization, and disengaged at 75% CPU utilization. When level 3 conditions are present, OCS 122 may apply a quota multiplier of 8 to the standard quota for each session. Regardless of the value determined using the quota multiplier for the different CPU overload levels (e.g., Level 1, Level 2, or Level 3), OCS 122 may not apply a quota value that exceeds a subscriber's available data limit.

Referring to FIG. 6B, overload configuration table 610 may also include overload level field 410, overload entry criteria field 420, overload exit criteria field 430, quota adjustment field 440, similar to data structure 400 of FIG. 4. Entries 612, 614, and 616 provide the particular transaction-based overload handling configuration. Values of entries 612, 614, and 616 are for illustrative purposes. According to different embodiments, values for entries 612, 614, and 616 may be manually selected, empirically derived, or determined using machine learning.

As shown in configuration table 610, entry 612 indicates an overload level 1 is triggered at 2500 transaction per second (TPS), and is disengaged at 2000 TPS. When level 1 conditions are present, OCS 122 may apply a quota multiplier of 1.5 to the standard quota for each session. Entry 614 indicates an overload level 2 is triggered when OCS 122 processes 3500 TPS, and is disengaged when the amount of transactions drops below 3000 TPS. When level 2 conditions are present, OCS 122 may apply a quota multiplier of 3 to the standard quota for each session. Entry 616 indicates an overload level 3 is triggered at 4750 TPS, and is disengaged at 3750 TPS. When level 3 conditions are present, OCS 122 may apply a quota multiplier of 6 to the standard quota for each session. Regardless of the value determined using the quota multiplier for the different TPS overload levels (e.g., Level 1, Level 2, or Level 3), OCS 122 may not apply a quota value that exceeds a subscriber's available data limit.

Figure 7:
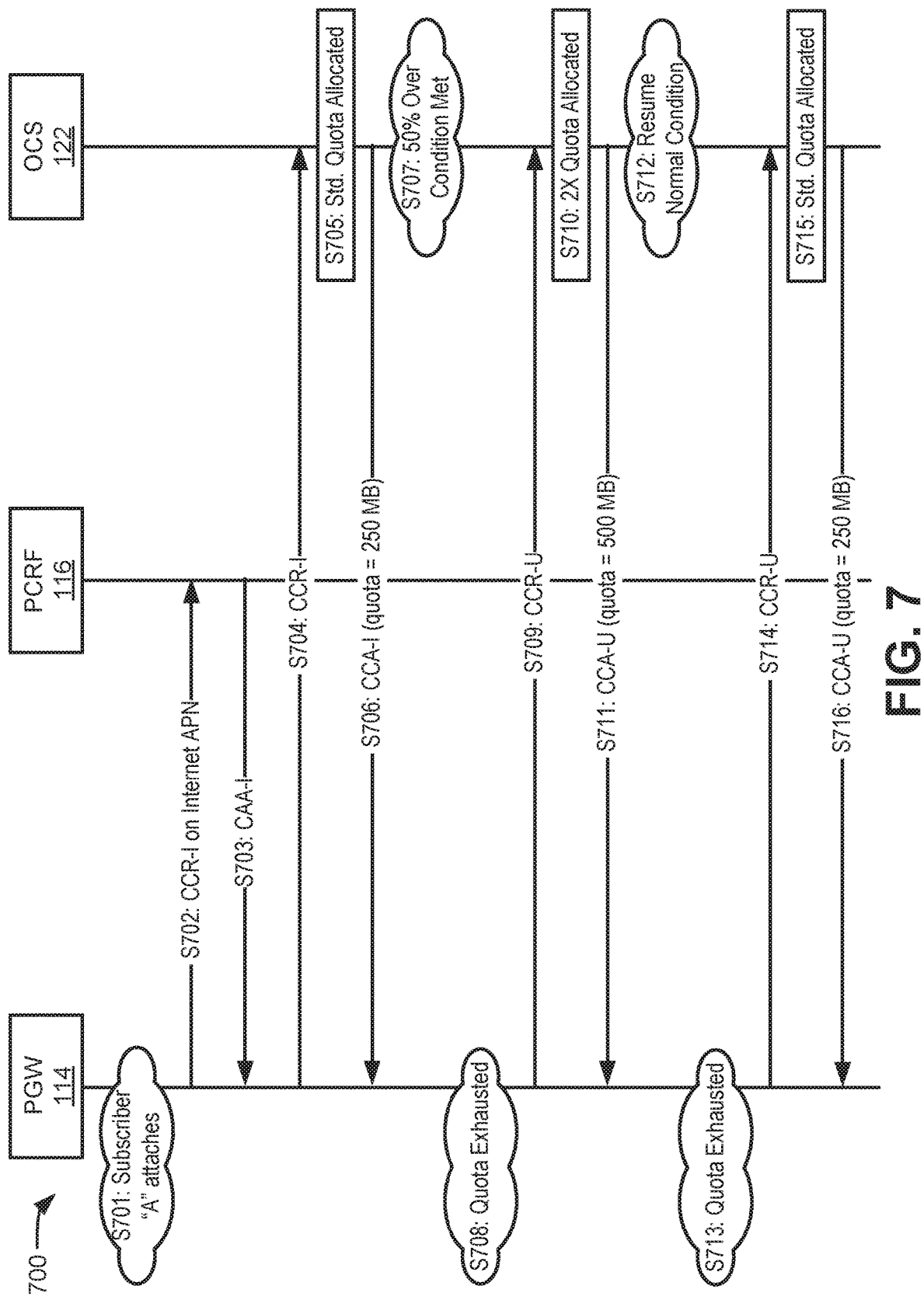
FIG. 7 illustrates communication flows for implementing proactive overload handling for a particular use case, according to an implementation described herein.

FIG. 7 illustrates communications for a use case for implementing proactive overload handling based on CPU utilization in a portion 700 of network 100. Network portion 700 may include PGW 114, PCRF 116, and OCS 122. Communications shown in FIG. 7 provide simplified illustrations of communications in network portion 700 and are not intended to reflect every signal or communication exchanged between devices. Furthermore, some communications shown in FIG. 7 may be indirect. For example, an indirect connection may involve an intermediary device (e.g., a Diameter signaling router) and/or an intermediary network not illustrated in FIG. 7.

As shown in FIG. 7, at step S701, a subscriber A (e.g., using UE 150-1) attaches to ePC network 110 and initiates an internet session. At step S702, PGW 114 sends an initial credit control request (CCR-I) to PCRF 116 on Gx interface 127. The CCR-I may include an access point name (APN) to be used for the session. PCRF 116 may receive the CCR-I and perform a policy evaluation based on policies and/or subscriber profile information in a subscriber profile repository (SPR). At step S703, PCRF 116 provides an initial credit control answer (CCA-I) to instruct PGW 114 to install rules and setup the session on the APN. At step S704, PGW 114 sends a CCR-I to OCS 122 via Gy interface 126 to request a quota for subscriber A. Assume, at step S705, that OCS 122 does not detect any potential overload conditions (e.g., based on applying overload configuration table 600 to current KPI levels for CPU usage). Thus, OCS 122 may allocate a standard quota for subscriber A. The quota may be, for example, 10% of the subscriber's total data limit, with a maximum of 250 MB and a minimum of 50 MB. At step S706, OCS 122 returns a CCA-I with the standard quota (e.g., 250 MB).

At step S707, assume OCS 122 has reached a 50% overload threshold (e.g., Level 1 overload entry criteria of entry 602 from overload configuration table 600). Thus, a quota multiplier will be applied when responding to all CCRs until the overload exit threshold is achieved. At step S708, PGW 114 detects that the standard quota from step S706 is exhausted and, at step S709, PGW 114 sends an updated CCR (CCR-U) to OCS 122 to request an updated quota for subscriber A's internet session. At step S710, OCS 122 may determine to double the standard quota for the CCR-U (e.g., as indicated by the quota multiplier of entry 602 from overload configuration table 600). Thus, in step S711, OCS 122 returns a CCA-U with double the standard quota (e.g., 500 MB, assuming at least that amount is available in the subscriber's account).

At step S712, assume that OCS 122 has recovered from a potential overload condition (e.g., achieving Level 1 overload exit criteria of entry 602 from overload configuration table 600). Thus, no quota multiplier will be applied when responding to the CCR-U. At step S713, PGW 114 detects that the doubled quota from step S711 is exhausted and, at step S714, PGW 114 sends another CCR-U to OCS 122. At step S715, OCS 122 may determine to use the standard quota for the CCR-U. Thus, in step S716, OCS 122 returns a CCA-U with the standard quota (e.g., 250 MB).

Figure 8:
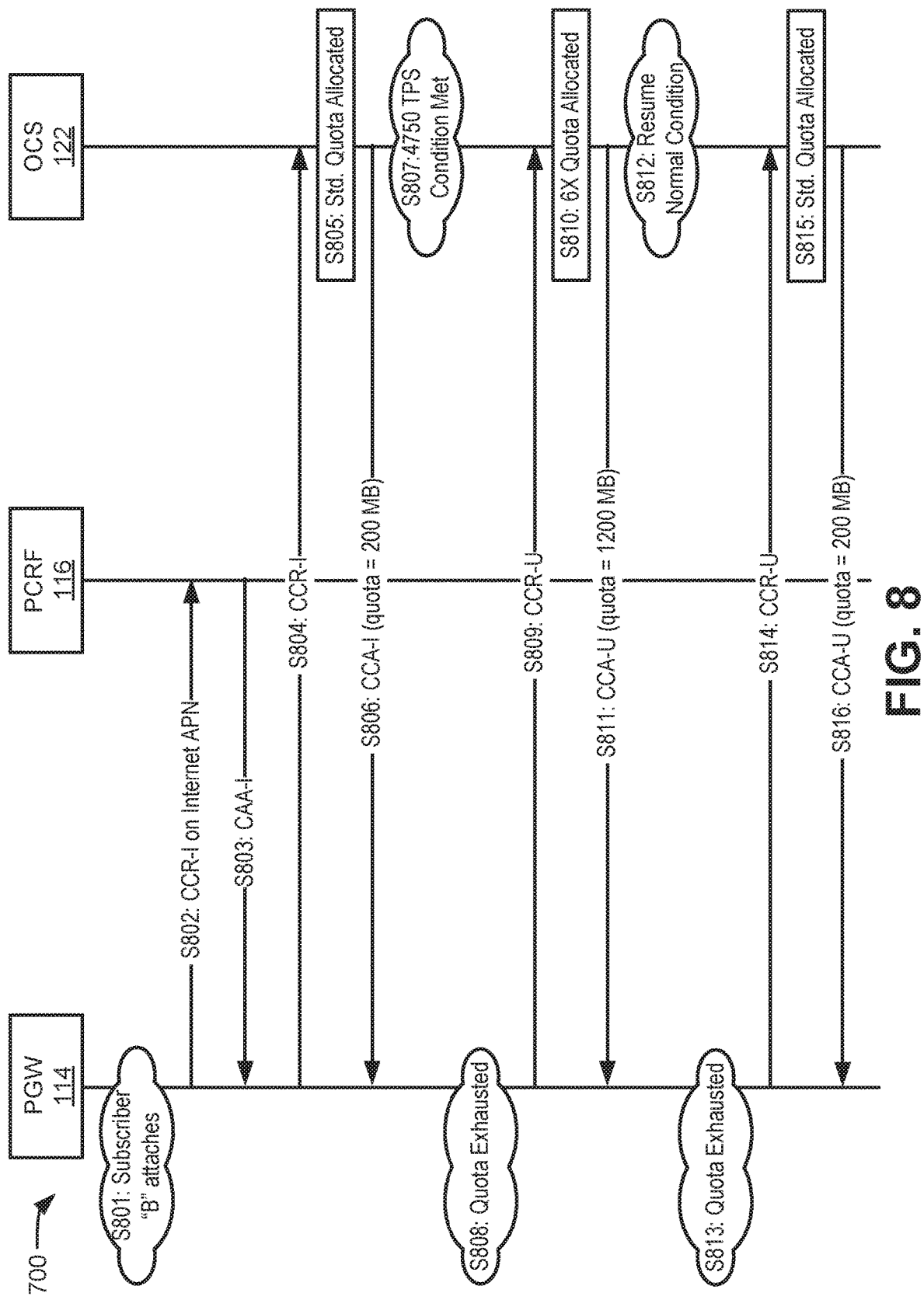
FIG. 8 illustrates communication flows for implementing proactive overload handling for another particular use case, according to an implementation described herein.

FIG. 8 illustrates communications for a use case for implementing proactive overload handling based on transactions per second in network portion 700. Communications shown in FIG. 8 provide simplified illustrations of communications in network portion 700 and are not intended to reflect every signal or communication exchanged between devices. Furthermore, some communications shown in FIG. 8 may be indirect. For example, an indirect connection may involve an intermediary device (e.g., a Diameter signaling router) and/or an intermediary network not illustrated in FIG. 8.

As shown in FIG. 8, at step S801, a subscriber "B" (e.g., using UE 150-2) attaches to ePC network 110 and initiates an internet session. At step S802, PGW 114 sends CCR-I to PCRF 116 on Gx interface 127. The CCR-I may include an access point name (APN) to be used for the session. PCRF 116 may receive the CCR-I and perform a policy evaluation based on policies and/or subscriber profile information in a subscriber profile repository (SPR). At step S803, PCRF 116 provides an initial credit control answer (CCA-I) to instruct PGW 114 to install rules and setup the session on the APN. At step S804, PGW 114 sends a CCR-I to OCS 122 via Gy interface 126 to request a quota for subscriber B. Assume, at step S805, that OCS 122 does not detect any potential overload conditions (e.g., based on applying overload configuration table 610 to current KPI levels for transactions). Thus, OCS 122 may allocate a standard quota for subscriber B, which may be, for example, 10% of the subscriber's total data limit, with a maximum of 250 MB and a minimum of 50 MB. At step S806, OCS 122 returns a CCA-I with the standard quota (e.g., 200 MB).

At step S807, assume OCS 122 determines that OCS 122 has reached a 4750 TPS threshold (e.g., Level 3 overload entry criteria of entry 616 from overload configuration table 610). Thus, a quota multiplier will be applied when responding to all CCRs until the overload exit threshold is achieved. At step S808, PGW 114 detects that the standard quota from step S806 is exhausted and, at step S809, PGW 114 sends an updated CCR (CCR-U) to OCS 122 to request an updated quota for subscriber B's internet session. At step S810, OCS 122 may determine to provide six times the standard quota for the CCR-U (e.g., as indicated by the quota multiplier of entry 616 from overload configuration table 610). Thus, in step S811, OCS 122 returns a CCA-U with six times the standard quota (e.g., 1200 MB up to the entire remaining data limit for the subscriber account).

At step S812, assume that OCS 122 has recovered from the potential overload condition (e.g., achieving Level 1 overload exit criteria of entry 612 from overload configuration table 610). Thus, no quota multiplier will be applied when responding to the CCR-U. At step S813, PGW 114 detects that the quota from step S811 is exhausted and, at step S814, PGW 114 sends another CCR-U to OCS 122. At step S815, OCS 122 may determine the standard quota for the CCR-U. Thus, in step S816, OCS 122 returns a CCA-U with the standard quota (e.g., 200 MB).

Figure 9A:
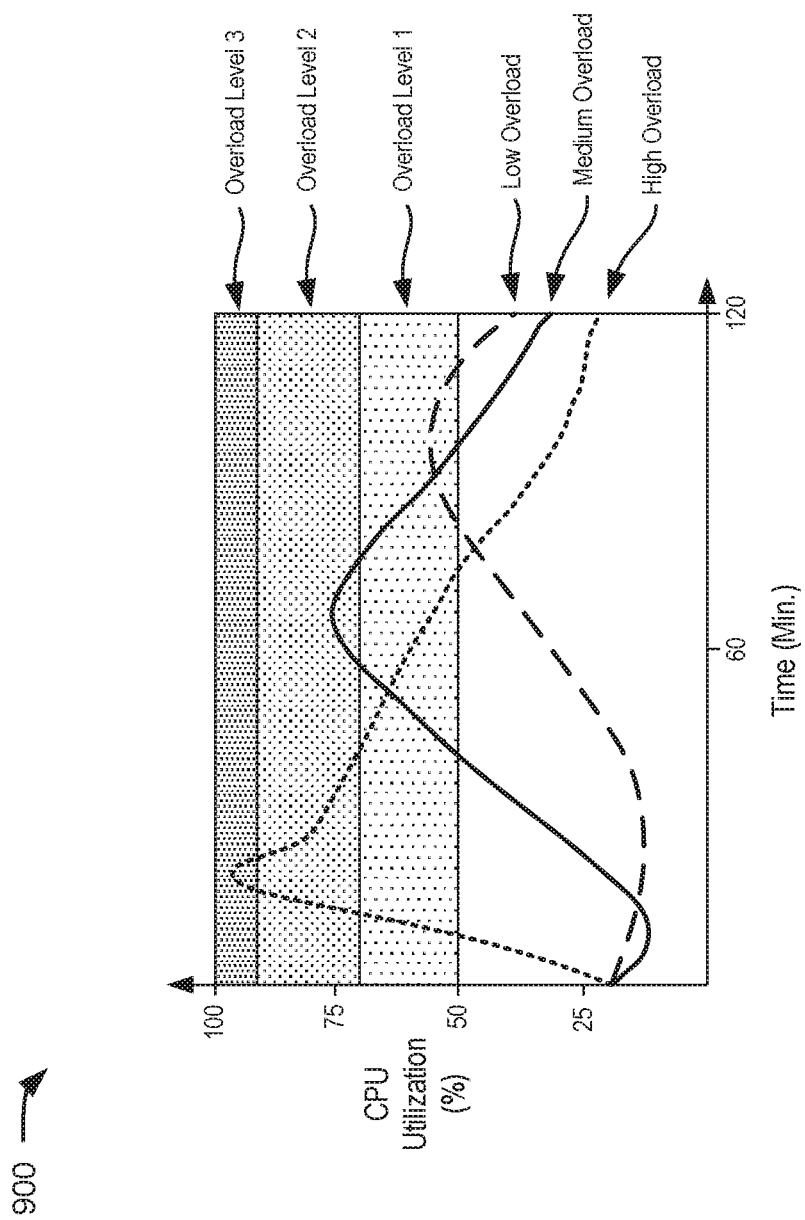
FIGS. 9A and 9B are graphs illustrating implementations of proactive overload handling.
Figure 9B:
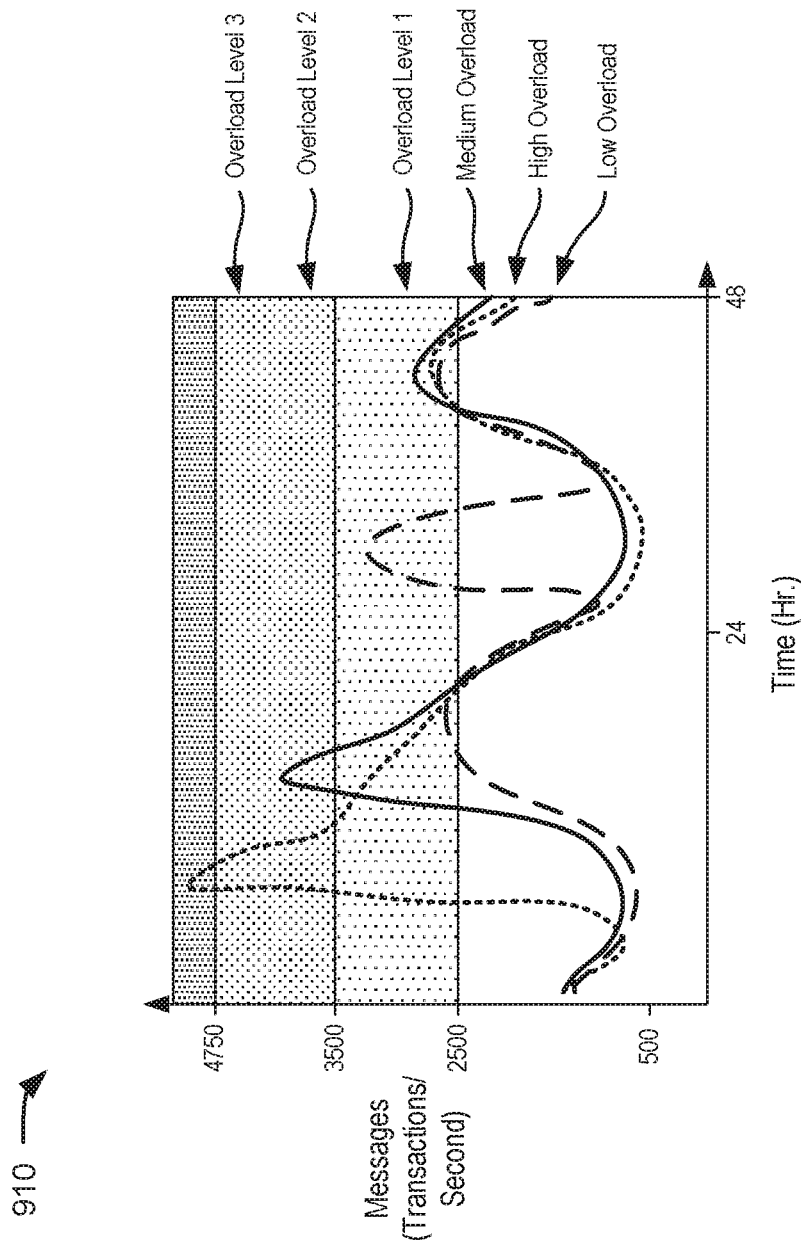

FIGS. 9A and 9B are graphs illustrating exemplary implementations of proactive overload handling. FIG. 9A illustrates a graph 900 of proactive overload scenarios based on CPU utilization, and FIG. 9B illustrates a graph 910 of proactive overload scenarios based on message loads.

Referring to FIG. 9A, in graph 900, three overload scenarios are plotted for CPU utilization percentage (e.g., of OCS 122) over time. Assume OCS 122 applies overload criteria from overload configuration table 600, such that overload level 1 begins at 50% CPU utilization, overload level 2 begins at 70% CPU utilization, and overload level 3 begins at 95% CPU utilization. Application of the overload criteria reduces the number of CCR-U messages over time by temporarily increasing the quota amounts for each CCA issued when CPU utilization levels are in one of the overload levels. The increased quota amounts will provide longer time intervals before user devices will need a CCR-U.

Referring to FIG. 9B, in graph 910, three overload scenarios are plotted for message loads (e.g., by OCS 122) over time. Assume OCS 122 applies overload criteria from overload configuration table 610, such that overload level 1 begins at 2500 TPS, overload level 2 begins at 3500 TPS, and overload level 3 begins at 4750 TPS. Application of the overload criteria reduces the number of CCR-U messages over time by temporarily increasing the quota amounts for each CCA issued when message levels are in one of the overload levels. Similar to the graph 900, the increased quota amounts will provide longer time intervals before user devices will need a CCR-U.

Systems and methods described herein proactively manage overloading for real-time systems, such as a credit management system. Overload levels and proactive response criteria may be generated using machine-learning algorithms with historical data. According to one implementation, the overload levels include entry criteria and exit criteria. When the OCS platform reaches a proactive overload level based on the entry criteria, the OCS platform will start allocating quota using a quota multiplier for the current overload level up to the subscriber's maximum remaining data allowance limit. If the platform utilization (e.g., as indicated by a KPI such as CPU capacity or TPS) continues to escalate, the OCS platform elevates the level and uses the appropriate quota multiplier. When the OCS platform slows to load levels below the exit criteria, normal quota operations resume. These actions will reduce the OCS platform load and allow more time for operations teams to react and/or for the platform to clear buffers/backlogs and any processes that may be causing the overload conditions.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. Particularly, while embodiments described herein are described primarily in the context of a 4G LTE network, the systems and methods described herein may also be applied to networks using other network standards, such as network functions in a 5G wireless core network. The description and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to mass storage 240.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
   storing, by a network device in a network, overload handling criteria for a real-time credit management system of the network,
   monitoring, by the network device, load conditions based on the overload handling criteria;
   receiving, by the network device, a credit control request; and
   allocating, by the network device, an increased resource quota, over a standard resource quota, for the credit control request when a potential overload condition exists.

2. The method of claim 1, further comprising:
   determining, by the network device and based on the monitoring, that the potential overload condition no longer exists;
   receiving, by the network device, another credit control request; and
   allocating, by the network device, the standard resource quota for the other credit control request based on determining the potential overload condition no longer exists.

3. The method of claim 1, further comprising:
   sending, by the network device and to another network device in the network, one or more credit control answers indicating the increased resource quota.

4. The method of claim 1, further comprising:
   generating the overload handling criteria based on historical data from the network device.

5. The method of claim 1, wherein the overload handling criteria includes a quota multiplier that is applied to increase request message intervals for a session.

6. The method of claim 1, wherein monitoring the load conditions further comprises at least one of:
   monitoring an available central processing unit capacity of the network device; or
   monitoring a number of transactions per second by the network device.

7. The method of claim 1, further comprising:
   generating, by the network device, an alert signal when the potential overload condition exists.

8. The method of claim 1, further comprising:
   maintaining the overload handling criteria in a centralized database accessible to multiple network devices.

9. The method of claim 1, further comprising:
   calculating the increased resource quota by the network device for a particular user device session based on the overload handling criteria.

10. A network device, comprising:
    an interface to communicate with other devices in a network;
    a memory configured to store instructions; and
    a processor, coupled to the interface and the memory, wherein the processor is configured to execute the instructions stored in the memory to:
       store overload handling criteria for a credit management system of the network,
       monitor load conditions based on the overload handling criteria,
       receive a credit control request, and
       allocate an increased resource quota, over a standard resource quota, for the credit control request when a potential overload condition exists.

11. The network device of claim 10, wherein the processor is further configured to execute the instructions stored in the memory to:
    receive another credit control request, and
    allocate the standard resource quota for the other credit control request when the potential overload condition no longer exists.

12. The network device of claim 10, wherein the processor is further configured to execute the instructions stored in the memory to:
    send, to another device in the network, a credit control answer indicating the increased resource quota.

13. The network device of claim 10, wherein the network device includes an online charging system (OCS) device in the network.

14. The network device of claim 10, wherein the processor is further configured to execute the instructions stored in the memory to:
send, to another network device, historical data of the network device, and
receive, from the other network device, the overload handling criteria based on the historical data.

15. The network device of claim 10, wherein, when monitoring the load conditions, the processor is further configured to execute the instructions stored in the memory to:
monitor an available central processing unit capacity of the network device; or
monitor a number of transactions per second by the network device.

16. The network device of claim 10, wherein the processor is further configured to execute the instructions stored in the memory to:
calculate the increased resource quota based on the standard resource quota and the overload handling criteria.

17. The network device of claim 10, wherein the overload handling criteria includes multiple load levels with a different quota multiplier associated with each of the multiple load levels.

18. A non-transitory computer-readable medium, storing instructions executable by one or more processors, the non-transitory computer-readable medium comprising one or more instructions to:
store overload handling criteria for a credit management system of a network;
monitor load conditions based on the overload handling criteria;
receive a credit control request; and
allocate an increased resource quota, over a standard resource quota, for the credit control request when a potential overload condition exists.

19. The non-transitory computer-readable medium of claim 18, further comprising one or more instructions to:
receive another credit control request,
allocate the standard resource quota for the other credit control request based on the overload handling criteria when the potential overload condition no longer exists, and
send, to another device in the network, a credit control answer indicating the standard resource quota.

20. The non-transitory computer-readable medium of claim 18, further comprising one or more instructions to:
send, to another device in the network, a credit control answer indicating the increased resource quota.

* * * * *